(12) United States Patent
Kobata

(10) Patent No.: US 6,393,471 B1
(45) Date of Patent: ＊May 21, 2002

(54) MARKETING DATA DELIVERY SYSTEM

(75) Inventor: Hiroshi Kobata, Brookline, MA (US)

(73) Assignee: Atabok, Inc., Newton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/518,378

(22) Filed: Mar. 3, 2000

Related U.S. Application Data

(63) Continuation of application No. 08/801,458, filed on Feb. 18, 1997, now Pat. No. 6,058,418.

(51) Int. Cl.[7] ............................................. G06F 15/177
(52) U.S. Cl. ..................... 709/221; 709/201; 709/202; 709/203; 709/222; 709/223; 709/214; 709/217; 709/218; 705/10; 705/14; 705/5; 707/10
(58) Field of Search .................................. 709/201–203, 709/220–221, 223–224, 217–218; 705/10, 14, 5; 707/10; 725/34–35

(56) References Cited

U.S. PATENT DOCUMENTS

| | | | |
|---|---|---|---|
| 5,421,009 A | 5/1995 | Platt ........................... | 709/221 |
| 5,758,072 A | 5/1998 | Filepp et al. ............. | 395/200.5 |
| 5,845,090 A | 12/1998 | Collins, III et al. ..... | 395/200.51 |
| 5,878,384 A * | 3/1999 | Tohson et al. .............. | 709/224 |
| 6,058,418 A * | 5/2000 | Kobata ....................... | 709/221 |

* cited by examiner

*Primary Examiner*—Krisna Lim
*Assistant Examiner*—Hieu C. Le
(74) *Attorney, Agent, or Firm*—Fish & Richardson, P.C.

(57) ABSTRACT

In an Internet-based client/server application, a system is provided which detects demographics of a client including CPU power, hard disk space, applications installed, network connectivity and log-in history so as to provide this infrastructure related information detailing client usage of the Internet to the service provider. In one embodiment, each user is provided with software having a unique serial number. Having the serial number, infrastructure data is checked at the client side and reported to the server periodically, with the server updating a database with the infrastructure data from each PC. In one embodiment, the database is filtered by factors such as location of the client and an indication of which providers delivered software to a client. After filtering, the service provider can obtain various demographics such as the demography of hard disk space, CPU power and viewers. In one embodiment, the demographics are used at the server to automatically select the contents to be transmitted to the particular client. Thus the provider can send the most appropriate contents to the most appropriate client based on demographic information of the client's infrastructure.

20 Claims, 4 Drawing Sheets

MARKETING DATA DELIVERY SYSTEM

This application is a continuation of Ser. No. 08/801,458 filed Feb. 18, 1997, now U.S. Pat. No. 6,058,418.

FIELD OF INVENTION

This invention relates to the provision of data over the Internet and, more particularly, to a system for ascertaining the demography of the users of the Internet.

BACKGROUND OF THE INVENTION

With the increased usage of the Internet comes the problem of deciding how and where to direct the information from the provider's point of view. With the advent of so-called "push" systems in which providers have direct access to the PC at the client side in a client/server application, it is increasingly important that the provider be provided with information so as to be able to direct the services to those users who are most likely to be interested.

In the past, the only type of demographic information that was available was to "guess" the usage of the system through use of sampling research data. In systems in which sampling research data is involved, a given research company will ask a major provider how many pieces of software were sold to the various users. Based on the data of the sales of the enabling software, the research company, utilizing mathematical techniques, provides demographic information to the provider based on a series of assumptions about the user.

However, the utilization of statistics alone based on the sales of software, for example, is not at all accurate in terms of providing the provider with targeted information as to the "real" demography of the user or client. For instance, it is impossible through statistics alone based on a single input such as sales to derive information relating to the CPU size and seed at the user, hard disk space availalle, information relating to the network connection such as dial-up cable modem connection information and ISDN connections, a list of the inventories indicating the applications running on the particular computer involved, as well as peripherals such as sound cards connected to the computer at the client side. Moreover, there is no way to ascertain the log-in history for each of the Internet users, such that critical information for the providers is not existent.

Critical information which is not available from traditional research is infrastructure information for a particular PC, such as CPU power, viewer, sound card and Internet connection information.

What is meant by the term "viewer" is what type of protocol is being run on the machine such as MPEG, QUICKTIME, AVI, and PDF.

The sum total of this infrastructure information would be useful for the decision maker at the provider as to decide whether or not, for instance, it is worth the money to make 3 megabytes of MPEG video available for advertising based on the above infrastructure demography. Thus, it is impossible for this decision maker to ascertain whether the Internet advertisement delivery will be efficient and worth enough to justify the cost, much less, for instance, providing an Internet video advertisement, the cost of which must be justified by assuring a number of targeted viewers for the subject matter of the video advertisement.

SUMMARY OF THE INVENTION

In order to provide such needed data to a content provide that wants to use the Internet connection, in one embodiment, client software is installed at each PC which can detect the infrastructure of the PC. The software which is provided by the provider to the user enables sensing CPU power, hard disk space, the applications running or installed, network connectivity and the log-in history. Since each client software has a unique serial number, sensing the serial number at the server side provides for rapid transfer and loading of a database with infrastructure data which is reported to the server periodically, for instance, every two seconds. At the server side, the database can be updated frequently to provide instant demographics of the particular user. It will be appreciated that the database can be filtered by such factors as location so that the provider can be apprised of what locations would be most interested in the content that the provider wishes to transmit. This permits the provider to be able to limit the broadcast of the data to selected locations.

It will be noted that the client software is delivered by the provider to the end user. By so doing, each provider is apprised of its own members, thus to provide the provider with the demographics of its own members or subscribers. This enables the content providers to be able to decide the content size to be delivered, as well as the viewer software, and makes the decision as to how much and what should be provided to an individual user tailored to the particular user's requirements.

For instance, in one operative embodiment, if a provider wants to make a two minute commercial, this can take as much eight megabytes to transmit. At this point, the provider must select what type of viewer software is required to play the eight megabytes of information, whether it is MPEG, QUICKTIME or some other format. By this manner, the provider can ascertain in real time whether or not the hard disk space is available at the user.

The distribution curve that is generatable through the utilization of the subject system, permits a bell curve to be formed in which hard disk space can be presented in terms of the number of users. Assuming that 8 megabytes is required, it can be determined what percentage of the channels are occupied by the information to be transmitted, and thus the number of PC's that are available to receive the intended transmission. If, for instance, 8 megabytes represent 80% of the channels, then the provider may well be advised that there is a sufficient number of PCs that can receive the information to commit the resources to providing the content-and transmitting it.

As will be appreciated, the subject system permits the content provider to make a decision as to whether or not to invest in a given project based on real-time demographics of users connected to the Internet. Note that in general, demographics are from members of the provider since the provider provides the client software to the end user. As a result, not only can content be tailored to the audience which could receive it, but critical decisions can be made as to whether to provide the content at all based on real-time sensing of the demography of the users.

The result is that by use of the subject system, provider can make business decisions such as the size of the video message, the viewer of the video/audio message, and the timing for hyper-advertisements through pulling or pushing at appropriate times. The subject system also makes possible other decisions which are critical to the economic utilization of the Internet. Furthermore, the demographic information permits marketing decisions as to where to sell the software and hardware based on the infrastructure data and the destination of the PC, namely its IP address.

In summary, in an Internet-based client/server application, a system is provided which detects demographics of a client including CPU power, hard disk space, applications installed, network connectivity and log-in history so as to provide this infrastructure related information detailing client usage of the Internet to the service provider. In one embodiment, each user is provided with software having a unique serial number. Having the serial number, infrastructure data is checked at the client side and reported to the server periodically, with the server updating a database with the infrastructure data from each PC. In one embodiment, the database is filtered by factors such as location of the client and an indication of which providers delivered software to a client. After filtering, the service provider can obtain various demographics such as the demography of hard disk space, CPU power and viewers. In one embodiment, the demographics are used at the server to automatically selects the contents to be transmitted to the particular client. Thus the provider-can send the most appropriate contents to the most appropriate client based on demographic information of the client's infrastructure.

Moreover, having derived the above demographic information, in one embodiment, an automatic selection system uses the demographics to provide specially tailored contents to the client. Files can thus be tailored to the client's ability to receive the file or even as to what content should be delivered. Thus whether full frame video should be sent, whether audio should be sent, or indeed what format is appropriate can be selected.

BRIEF DESCRIPTION OF THE DRAWINGS

These and other features of the subject invention will be better understood taken in conjunction with the Detailed Description in conjunction with the figures of which.

DETAILED DESCRIPTION

Figure 1:
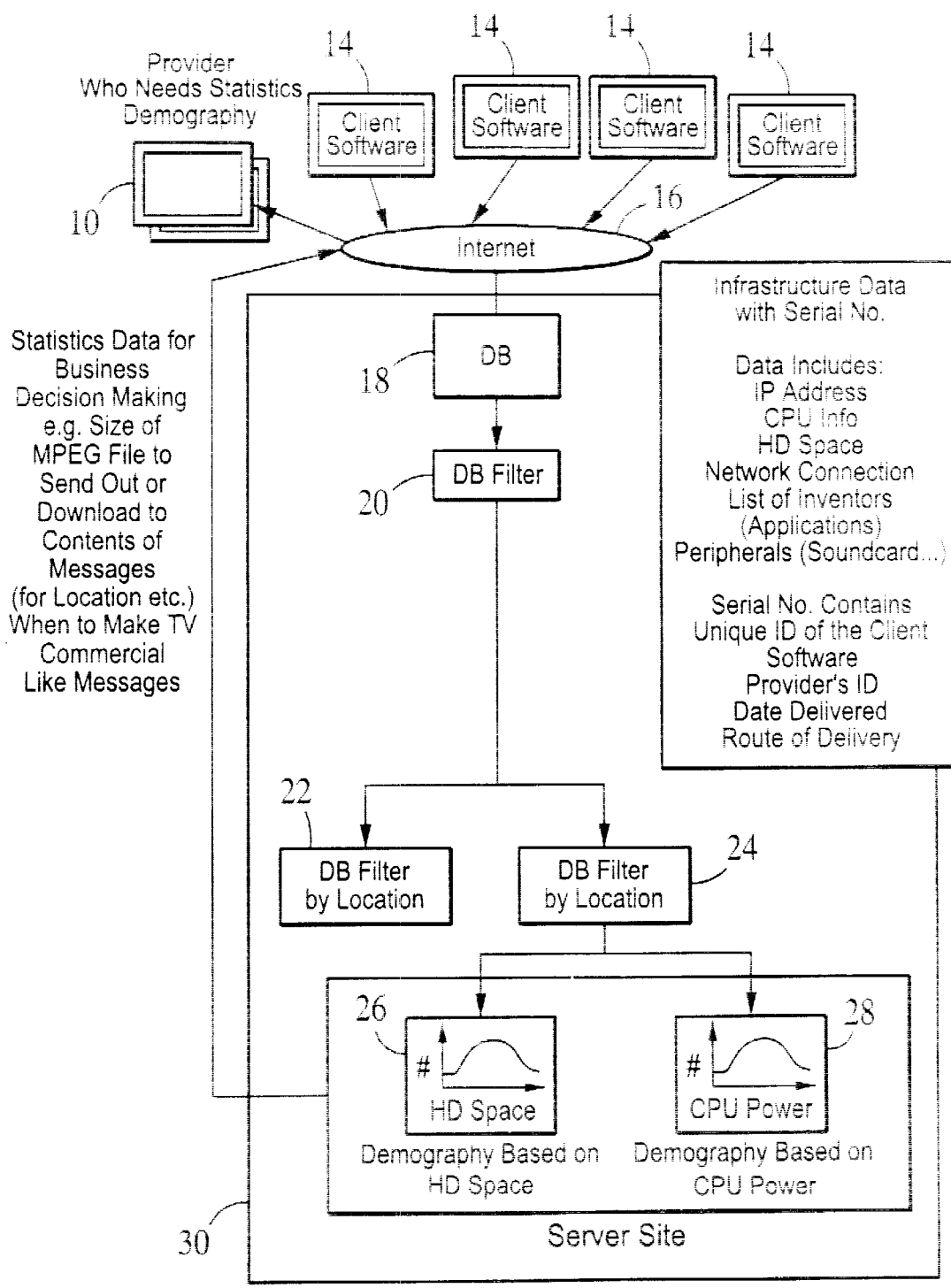
FIG. 1 is a block diagram of the subject system illustrating the ability to provide a database with real-time demographic information from the users, along with a filter system to be able to tailor the demographic output to be the most useful to the provider.

Referring now to FIG. 1, in the subject system, a provider 10 provides software to each of clients 14 which causes the associated computer connected to the Internet to transmit not only a serial number, but also the IP address, CPU information, hard disk space, network connection, a list of inventories, peripherals such as sound cards, and the log-in history associated with each individual client. Client and server are connected via the Internet, here diagrammatically illustrated at 16.

The information is passed to a database 18 at the provider which, optionally, is provided with a database filter 20 so that the data may be filtered as to location as illustrated at 22 or is further filtered by the provider as illustrated at 24. It will be appreciated that there are other filter functions that can be applied to the database for the filtering of the statistics garnered by the subject system.

If, as illustrated, the statistics come from members of the provider because the provider provides the client software, then the provider is provided with information relating to his members and his members alone.

The data, when retrieved, may be in the form of a graph 26 of hard disk space versus number of CPU's or, alternatively, can be provided in terms of CPU power as illustrated at 28, with the information being developed at the server side, here illustrated at 30, and with the information from the server side being delivered to the provider after it has been derived.

Figure 2:
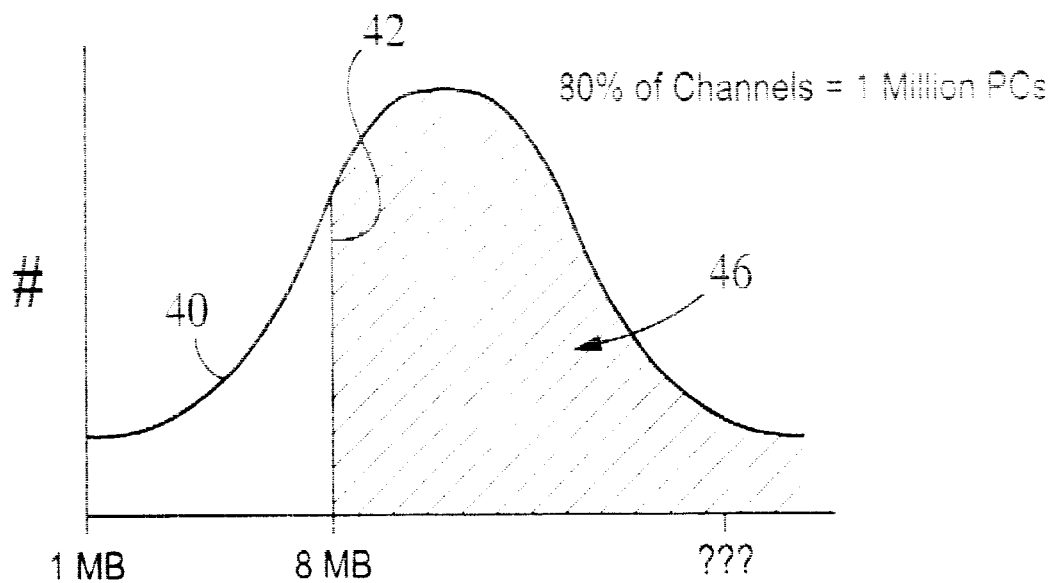
FIG. 2 is a graph illustrating the results of the subject system in which hard disk space is graphed against the number of users.

Referring now to FIG. 2, a graph is shown of hard disk space versus the number of users which, as will be appreciated, is developed in a bell shaped curve 40 with one end of the curve illustrating the number of users having only, 1 kilobyte of disk space and with the other end reflecting 1 gigabyte of disk space. As mentioned hereinbefore, it can be seen that with 8megabytes of information to be transmitted as illustrated by line 42, shaded area 46 represents approximately 80% of the channels and thus, in one instance, over a million PC's having the capability of receiving 8 megabyte transmissions. From this graph, a decision maker can decide that it is worth the time, effort and money to invest in the aforementioned two minute advertising sequence, with the graph giving the provider an instant view of his audience.

Figure 3:
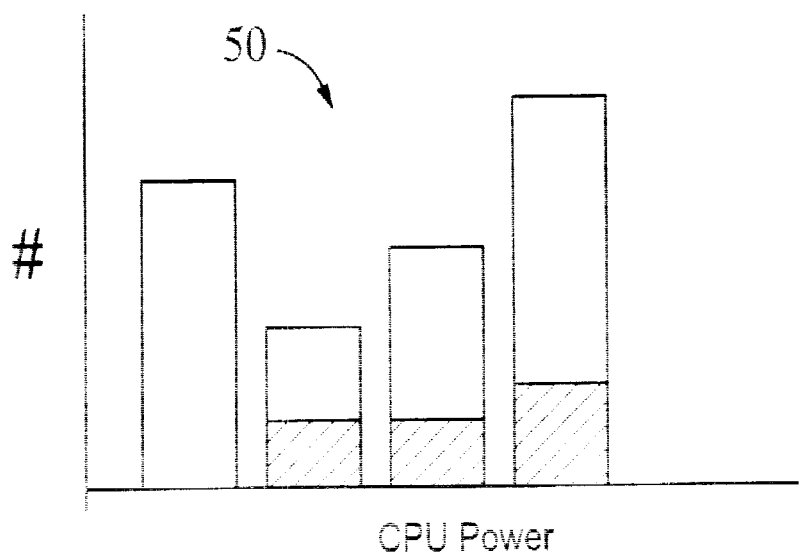
FIG. 3 is a bar graph illustrating CPU power as a functions of the number of users.

Referring now to FIG. 3, what is shown is a bar graph 50 which charts CPU power versus number of CPU's, knowing computer power can lead to deductions about peripherals. For instance, one can deduce whether or not there is a sound card associated with a given PC. Thus in terms of CPU power, one can deduce if there is a 155 megahertz 486 processor installed, and/or if a sound card is in existence, because such computers usually come with a sound card installed. This being the case, it can be assumed that multimedia transmissions can be handled by such a CPU.

Additionally, not only will the providers be provided with information regarding the capability of the particular CPU to receive multimedia transmissions, these user's are also a very good target for the sales of sound cards. As a result, messages advertising sound cards can be sent directly only to those users which have sufficient CPU power.

In general, the client software is delivered along with applications software by the provider and is transparent to the user. At the provider's election, data relating user's identity can be inhibited so that the system is a pure anonymous demographics system. The system can be made anonymous simply by sensing only the IP address of the user as opposed to the user's identity. Thus, while the user's identity remains anonymous, his buying habits and usage create a powerful tool to direct advertising and other content to the user based on his prior usage, the ability of a CPU to receive the intended message and other factors. Note, however, that providers may seek to provide targeted advertisement and content to a particular user, assuming that the provider has the user's permission to do so.

Figure 4:
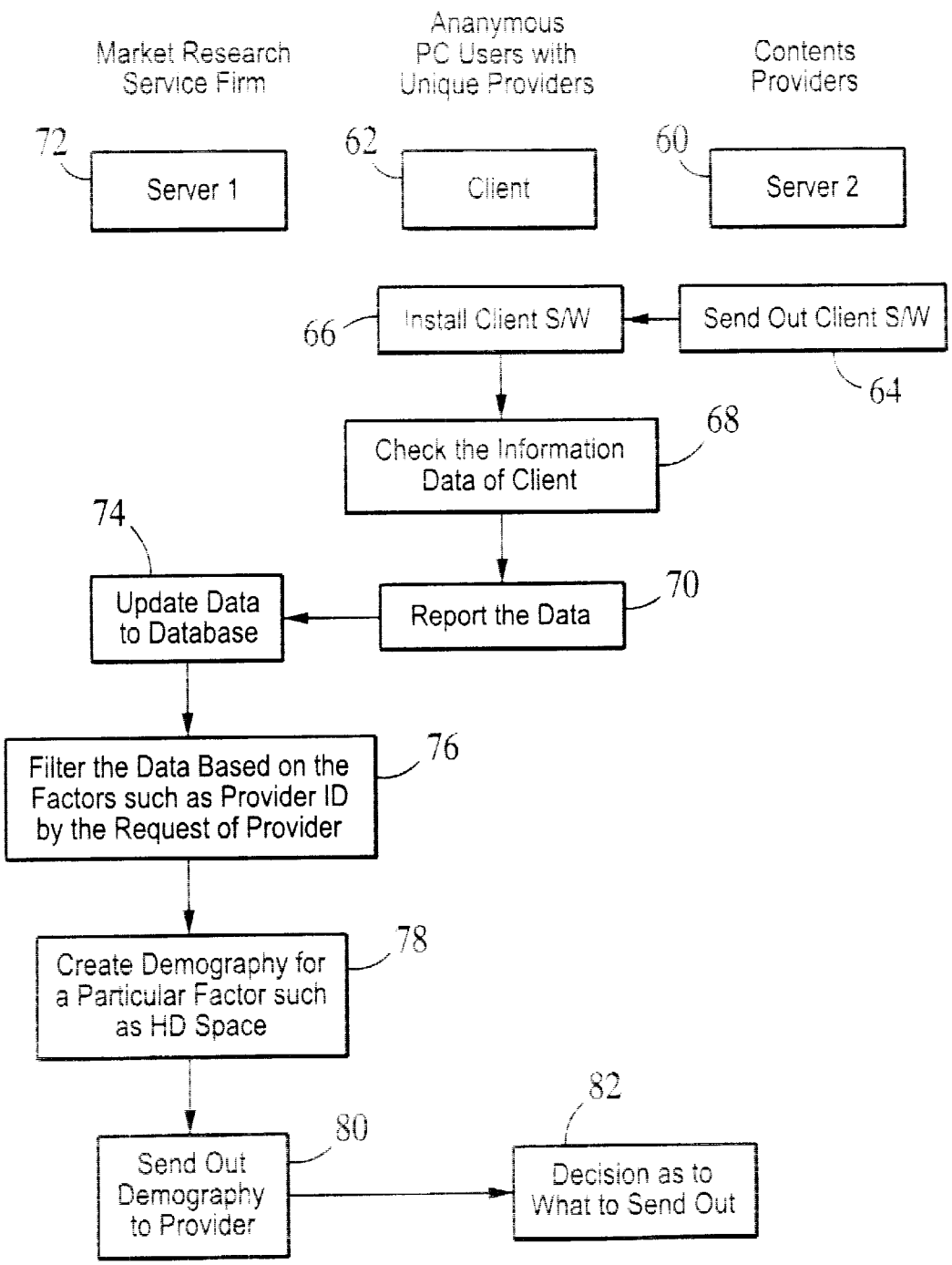
FIG. 4 is a block diagram and flow chart illustrating one embodiment of the subject system indicating client-initiated data reporting based on client-installed software from the provider; and, FIG. 5 is a block diagram of the use of the demographic information for automatic delivery selection by the server.

Referring now to FIG. 4, a flow chart is presented in which server 2, here illustrated at 60, sends out to client 62 a client software package 64 which is installed as illustrated at 66 at the client's PC. The software checks the infrastructure data of the client as illustrated at 68 and reports the data as illustrated at 70 through the Internet through server 1, here illustrated at 72, which updates the data to its database as illustrated at 74. The output of the database is filtered at 76 based on functions such as provider ID or other factors. The filtered data is used at 78 to create a demography for the particular filtered factor such as hard disk space. As illustrated at 80, the result of the demography is provided to provider by sending this demography to server 6 such that a decision maker 82 relying on data from Server 2 can make the appropriate decisions as to what to send out, e.g. 4 MB MPEG, 300 kB PDF etc.

Figure 5:
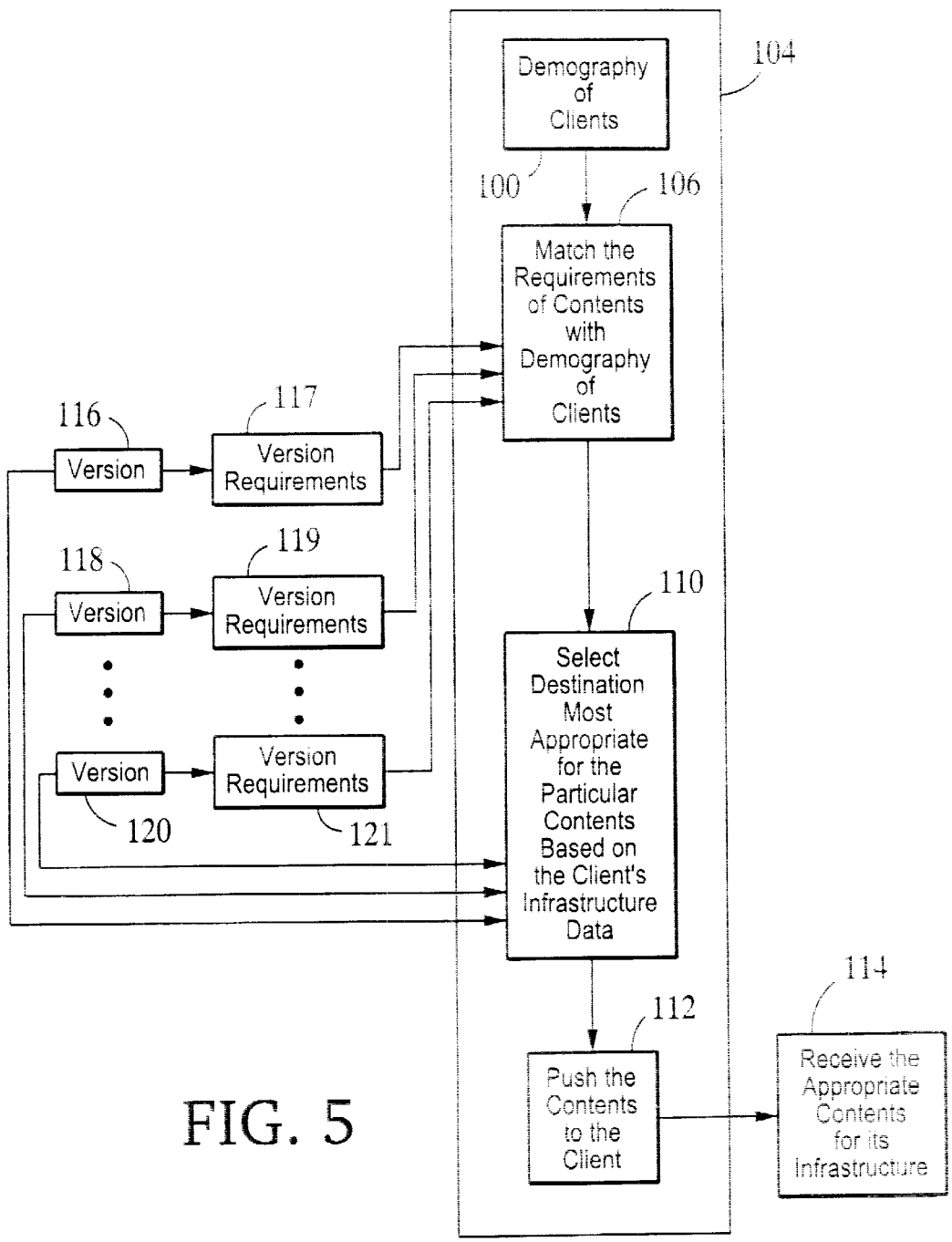

Referring now to FIG. 5, having derived the infrastructure demographies of a client's PC, it is possible to tailor the contents and delivery from a server to a given client in a so-called "push" system. First, based on log-in history, hard disk space and a variety of factors such as available as demography 100, a content provider can decide whether the proposed content would be suitable to the infrastructure of the client. Based on infrastructure information relating to actual use of a client's PC, including applications previously run, it is possible to ascertain the user's willingness or receptiveness to receiving the proposed content. Thus the content need only be pushed to users who in all likelihood would welcome receipt.

Additionally, it is possible for the content provider to have several different versions of the content. One version might require MPEG compatibility and a sound card. Another version might be a reduced file size or just a document.

As can be seen from FIG. 5, an automatic delivery system 104 is provided which selects the destination of the contents based on the ability of a client to receive a given version of the contents. This is done by matching the requirements of the particular version of the contents with the demography of the client as shown at 106. Assuming only one version 116 of the contents, version requirements 117 for this version are matched at module 106 with the infrastructure of the clients. For those clients having infrastructure which can handle the particular version, destination selection module 110 switches version 116 to the appropriate clients.

Thus, upon a match, selection module 110 selects the destinations most appropriate for particular version of use the contents, at which time the version 116 is transmitted directly to the client's PC in a push operation as illustrated at 112.

The result is the receipt of a version appropriate for the infrastructure of the particular client as illustrated at 114.

As mentioned above, for contents available in different versions, it is possible to select from different versions of the contents, here shown at 118 and 120, in order to match the pushed version to the client's infrastructure.

Each version has a set of corresponding version requirements 119 and 121. These version requirements are supplied to, matching module 106 which determines not which clients can receive a given version, but rather which versions can be sent to which clients. Selection module 110 then couples the appropriate version to the appropriate clients in a push operation.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A marketing data delivery system for in a client/server system connected by a network in which information is transmitted by a service provider over the network via a server, the marketing data delivery system comprising:

means at said client including a computer for running client software;

client software provided by said service provider to said client to be run on the associated computer for ascertaining demographic information related to said client and for periodic transmission thereof back to said server;

means at said client for periodically transmitting said demographic information to said server; and, means at said server for creating a database of information transmitted from said client, for filtering the data in said database as to demographic parameters and for displaying the resultant information; and means for automatically making marketing decisions based on results of the filtering of said database, wherein said marketing decisions comprise at least one of determining which of a plurality of client-users should be targeted to receive specific information content based on locations of said client-users and determining whether a particular one of said client-users would welcome receipt of specific information content from a content-provider.

2. The marketing data delivery system as recited in claim 1, wherein said marketing decisions further comprise determining a complexity of marketing information content to be transmitted to said client.

3. The marketing data delivery system as recited in claim 2, wherein said means for automatically making marketing decisions comprises:

a matching module having an input for receiving data from said means for creating said database, wherein said matching module is operable to match a version of said marketing information content to clients capable of receiving and processing said version of said marketing information; and a selection module having an input connected to said matching module, wherein said selection module is operable to select destinations of the clients capable of receiving and processing said version of said marketing information.

4. The marketing data delivery system as recited in claim 1, wherein said marketing decisions comprise determining which of said plurality of client-users should be targeted to receive said specific information content based on said locations of said client-users.

5. The marketing data delivery system as recited in claim 1, wherein said marketing decisions comprise determining whether said particular one of said client-users would welcome receipt of said specific information content from said content-provider.

6. A marketing data delivery system for a client/server system connected by a network in which information is transmitted by a service provider over the network via a server, the marketing data delivery system comprising:

a client subsystem for interfacing with a client-user, wherein said client subsystem comprises:

a computer, client software to be run on said computer, wherein said client software ascertains demographic information related to said client subsystem, wherein said demographic information includes at least one of a client usage pattern and client infrastructure resources, and a transmitter connected to said computer, wherein said transmitter is operable to periodically transmit said demographic information to said server; and a server subsystem that includes said server, further comprising:
  a database generator for creating a database of demographic information transmitted from said client subsystem, and for filtering said demographic information in said database according to demographic parameters, and
  a marketing decision module operable to automatically make marketing decisions based on results of the filtering of said database, wherein said marketing decisions comprise at least one of determining which of a plurality of client-users should be targeted to receive specific information content based on locations of said client-users and determining whether a particular one of said client-users would welcome receipt of specific information content from a content-provider.

7. The marketing data delivery system as recited in claim 6, wherein said marketing decisions further comprise determining a complexity of marketing information content to be transmitted to said client.

8. The marketing data delivery system as recited in claim 7, wherein said marketing decision module comprises:
  a matching module having an input for receiving data from said database generator, wherein said matching module is operable to match a version of said marketing information content to clients capable of receiving and processing said version of said marketing information; and
  a selection module having an input connected to said matching module, wherein said selection module is operable to select destinations of the clients that are capable of receiving and processing said version of said marketing information.

9. The marketing data delivery system as recited in claim 6, wherein said marketing decisions comprise determining which of said plurality of client-users should be targeted to receive said specific information content based on said locations of said client-users.

10. The marketing data delivery system as recited in claim 6, wherein said marketing decisions comprise determining whether said particular one of said client-users would welcome receipt of said specific information content from said content-provider.

11. The marketing data delivery system as recited in claim 6, wherein said client software controls periodic transmission of said demographic information back to said server.

12. A marketing data delivery system for a client/server system connected by a network in which information is transmitted by a service provider over the network via a server, the marketing data delivery system comprising:
  a client subsystem for interfacing with a client-user, wherein said client subsystem comprises:
    a computer;
    client software to be run on said computer, wherein said client software ascertains demographic information related to said client subsystem, wherein said demographic information includes at least one of an existence of a sound card and types of viewer protocols said computer is configured to process; and
    a transmitter connected to said computer, wherein said transmitter is operable to periodically transmit said demographic information to said server; and
  a server subsystem, which includes said server, further comprising a database generator for creating a database of information transmitted from said client subsystem, and for filtering the data in said database according to demographic parameters.

13. The marketing data delivery system as recited in claim 12, wherein said server subsystem further comprises a decision making module operable to determine a complexity of marketing information content to be transmitted to said client based on said demographic information of said client subsystem.

14. The marketing data delivery system as recited in claim 12, wherein said demographic information optionally further includes CPU processing power, hard disk capacity, identities of installed applications, modem speed, log-in history, and serial numbers of said client software.

15. The marketing data delivery system as recited in claim 12, wherein said client software controls periodic transmission of said demographic information back to said server.

16. The marketing data delivery system as recited in claim 14, wherein said marketing decisions further comprise determining a complexity of marketing information content to be transmitted to said client subsystem.

17. The marketing data delivery system as recited in claim 15, wherein said marketing decision module comprises:
  a matching module having an input for receiving data from said database generator, wherein said matching module is operable to match a version of said marketing information content to clients capable of receiving and processing said version of said marketing information; and
  a selection module having an input connected to said matching module, wherein said selection module is operable to select destinations of the clients that are capable of receiving and processing said version of said marketing information.

18. The marketing data delivery system as recited in claim 14, wherein said marketing decisions comprise determining which of said plurality of client-users should be targeted to receive said specific information content based on said locations of said client-users.

19. The marketing data delivery system as recited in claim 14, wherein said marketing decisions comprise determining whether said particular one of said client-users would welcome receipt of said specific information content from said content-provider.

20. A marketing data delivery system for delivering marketing data via a server subsystem, comprising:
  software for receiving demographic information related to a client subsystem communicated by said client subsystem;
  a database generator for creating a database of said demographic information; and
  a marketing decision module operable to automatically make marketing decisions based on said demographic information in said database, wherein said marketing decisions comprise at least one of determining which of a plurality of client-users should be targeted to receive specific information content based on locations of said client-users and determining whether a particular one of said client-users would welcome receipt of specific information content from a content-provider.

* * * * *